US007069213B2

(12) United States Patent
Thompson

(10) Patent No.: US 7,069,213 B2
(45) Date of Patent: Jun. 27, 2006

(54) INFLUENCING A VOICE RECOGNITION MATCHING OPERATION WITH USER BARGE-IN TIME

(75) Inventor: Scott A. Thompson, Wellington, FL (US)

(73) Assignee: NetByTel, Inc., Boca Raton, FL (US)

( * ) Notice: Subject to any disclaimer, the term of this patent is extended or adjusted under 35 U.S.C. 154(b) by 800 days.

(21) Appl. No.: 10/047,741

(22) Filed: Nov. 9, 2001

(65) Prior Publication Data

US 2003/0093274 A1     May 15, 2003

(51) Int. Cl.
    *G10L 15/00*       (2006.01)
(52) U.S. Cl. .............. 704/231; 704/275; 379/88.02
(58) Field of Classification Search .......... 704/231, 704/251–255, 270, 275; 379/88.02
    See application file for complete search history.

(56) References Cited

U.S. PATENT DOCUMENTS

| 5,765,130 | A | * | 6/1998 | Nguyen ...................... 704/233 |
| 5,924,016 | A | * | 7/1999 | Fuller et al. ............ 379/202.01 |
| 5,956,675 | A | * | 9/1999 | Setlur et al. ................ 704/231 |
| 5,991,726 | A | * | 11/1999 | Immarco et al. ............ 704/270 |
| 6,282,268 | B1 | * | 8/2001 | Hughes et al. ........... 379/88.03 |
| 6,311,159 | B1 | * | 10/2001 | Van Tichelen et al. ..... 704/275 |
| 6,418,216 | B1 | * | 7/2002 | Harrison et al. ....... 379/208.01 |
| 6,453,020 | B1 | * | 9/2002 | Hughes et al. ........... 379/88.04 |
| 6,526,382 | B1 | * | 2/2003 | Yuschik ...................... 704/275 |
| 6,539,078 | B1 | * | 3/2003 | Hunt et al. .............. 379/88.04 |
| 6,574,595 | B1 | * | 6/2003 | Mitchell et al. ............ 704/242 |
| 6,606,598 | B1 | * | 8/2003 | Holthouse et al. .......... 704/275 |
| 6,724,864 | B1 | * | 4/2004 | Denenberg et al. ...... 379/88.16 |
| 6,725,199 | B1 | * | 4/2004 | Brittan et al. ............... 704/258 |
| 6,813,342 | B1 | * | 11/2004 | Chu et al. ................ 379/88.01 |

* cited by examiner

*Primary Examiner*—Wayne Young
*Assistant Examiner*—Michael N. Opsasnick
(74) *Attorney, Agent, or Firm*—Stephen Bongini; Fleit, Kain, Gibbons, Gutman, Bongini & Bianco P.L.

(57) ABSTRACT

A system, method and computer program product for automated voice recognition using the barge-in time of a user's utterance is provided. A list of items is audibly provided to a user. The user selects one item from the list by providing an utterance representing the user's selection. The utterance time (i.e., the barge-in time) is calculated from the utterance of the user. Then, the utterance is compared to each item in the list so as to generate a confidence score for each item in the list, with the confidence score being based on the similarity between the item and the utterance. The confidence scores are also based on the barge-in time. One of the items from the list is selected based on the confidence scores of the items.

24 Claims, 7 Drawing Sheets

INFLUENCING A VOICE RECOGNITION MATCHING OPERATION WITH USER BARGE-IN TIME

BACKGROUND OF THE INVENTION

1. Field of the Invention

The present invention relates to the field of voice recognition and, more specifically, to a voice recognition technique for selecting an item from a list.

2. Description of Related Art

The use of voice recognition applications is on the rise. Voice recognition applications are used for computer interfaces, identification systems and automated telephone systems. As computing power increases and voice recognition techniques improve, the capabilities of voice recognition applications are growing. As companies move towards reducing operating costs, the need for automated systems has increased. One example of an automated system is a voice recognition application that relates to purchasing products. A user connects to the voice recognition application via a telephone (or other device) and proceeds to purchase a product for delivery using normal speech. In this exemplary application, the user can be audibly provided with a list of products from which to choose. The user provides his selection by saying the name of the product he desires to purchase. The voice recognition application then attempts to match the user's utterance with a product's name using conventional voice recognition techniques.

Current voice recognition techniques, however, do not come without drawbacks. A problem that is being experienced by current voice recognition techniques is the matching of a user's utterance with an item from a list. Taking the product purchasing voice recognition application as an example, products can have similar sounding names. As a result, the voice recognition application can experience difficulty in matching the user's utterance with the correct product name from the list. Another problem is that noise can be present in the user's utterance. This can also pose an obstacle during matching. Yet another problem is that the range of users' voices is very broad. This can also pose a problem during matching as the range of sounds that will be correctly matched by a voice recognition application is limited.

Accordingly, there exists a need for a voice recognition technique that effectively matches a user's utterance with an item from a list.

SUMMARY OF THE INVENTION

It is an object of the present invention to overcome the above-mentioned drawbacks and to provide systems, methods and computer program products for improving voice recognition using the barge-in time of a user's utterance. In a preferred embodiment of the present invention, a list of items is audibly provided to a user. The user selects one item from the list by providing an utterance (i.e., saying a word or phrase) representing the user's selection. The utterance time (i.e., the barge-in time) is calculated, and the utterance is compared to each item in the list. Subsequently, a confidence score is generated for each item in the list, with the confidence score of each item being based on the similarity between the item and the utterance. The confidence score of each item is also based on the barge-in time. One of the items from the list is selected based on the confidence scores of the items.

Another object of the present invention is to increase the accuracy of a voice recognition system. The barge-in time of a user is used as an additional factor to consider during comparison of each item in a list to the user's utterance. This feature supplements the accuracy of the voice recognition system. Furthermore, the use of the barge-in time as an additional factor allows a non-speech factor to be used during comparison of each item to the utterance. This feature supplements accuracy by broadening the pool from which the comparison factors are taken.

Yet another object of the present invention is to increase the speed of a voice recognition system. The use of barge-in time as an additional factor to consider during comparison of each item to an utterance can increase the speed with which the voice recognition application arrives at the selection of an item from a list.

A further object of the present invention is to decrease the probability of false acceptances and false rejections. A false acceptance occurs when a voice recognition application incorrectly accepts an utterance as a match. Likewise, a false rejection occurs when a voice recognition application incorrectly rejects an utterance for a match. As the accuracy of the voice recognition system is increased by the use of the barge-in time, the probability of false acceptances and false rejections decreases. This leads to an increase in the overall efficiency of the voice recognition application.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION OF PREFERRED EMBODIMENTS

1. Overview

The present invention is described in terms of the exemplary embodiments below. This is for convenience only and is not intended to limit the application of the present invention. In fact, after reading the following description, it will be apparent to one of ordinary skill in the relevant art(s) how to implement the present invention in alternative embodiments.

Figure 1:
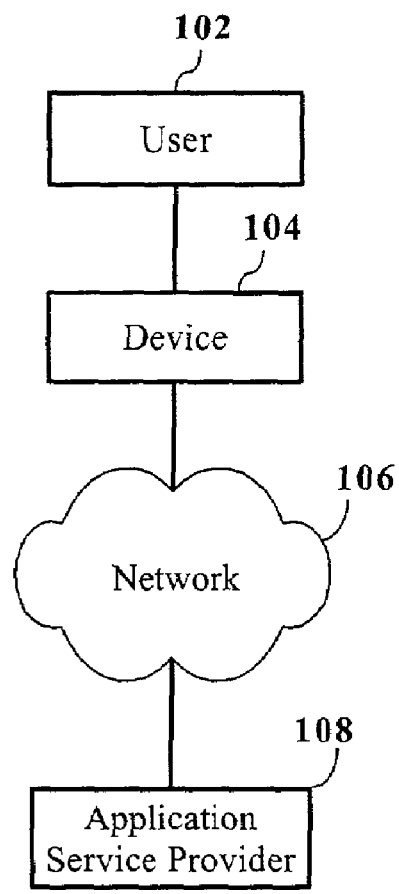
FIG. 1 is a block diagram illustrating the overall system architecture of an embodiment of the present invention.

FIG. 1 is a block diagram illustrating the overall system architecture of an embodiment of the present invention. FIG. 1 is a generalized embodiment of the present invention illustrating an Application Service Provider (ASP) model of the present invention. This model represents a method by which an entity (the ASP) separate from a client provides a service to the client, typically in exchange for a fee. The system 100 includes a user 102, a device 104, a network 106 and an ASP 108. User 102 is a person that is using device 104 to access the services of ASP 108 via network 106.

In one embodiment of the present invention, network 106 is a circuit-switched network such as a Public Switched Telephone Network (PSTN), which is also known as the Plain Old Telephone System (POTS). In another embodiment of the present invention, network 106 is a packet-switched public wide area network (WAN) such as the global Internet. Network 106 can alternatively be a private WAN, a local area network (LAN), a telecommunications network or any combination of the above-mentioned networks. Network 106 can be wired, wireless, broadcast or point-to-point.

In the embodiment in which network 106 is a PSTN, user device 104 is a telephone-capable device for sending and receiving audio signals. In preferred embodiments of the present invention, device 104 is an ordinary telephone or a mobile/cell phone. In further embodiments of the present invention, device 104 can be a personal computer (PC) (e.g., an IBM or compatible PC workstation running the Microsoft Windows 95/98/2000 or Windows NT operating system, a Macintosh computer running the Mac OS operating system, or the like), a Personal Digital Assistant (PDA) (e.g., a PalmPilot running the Palm OS operating system), a game console (e.g., a Sega Dreamcast console or a Sony Playstation 2 console) or an interactive television. In the embodiment in which network 106 is a packet-switched network such as the Internet, user device 104 is a network-capable device for sending and receiving audio signals. For example, device 104 can be a PC, a PDA, a game console, interactive television or any other network-capable processing device able to communicate via the network 106.

ASP 108 includes a voice recognition application (VRA). The VRA is a natural language processing application program that may be implemented in hardware, software or any combination of the two. The VRA is described in greater detail below. ASP 108 can also include a database for storing and retrieving information for provision to user 102. The database can be any commercially-available database system implemented in hardware, software or any combination of the two.

In one embodiment of the present invention, ASP 108 is one or more SUN Ultra workstations running the SunOS operating system. In another embodiment of the present invention, ASP 108 is one or more IBM or compatible PC workstations running either the Windows 2000 operating system or the BSD Unix operating system. ASP 108 is connected to network 106 which serves as the communications medium between ASP 108 and its clients (e.g., user device 104). While only one user 102 and only one device 104 are shown in FIG. 1 for ease of explanation, the system 100 may support any number of users 102 and devices 104.

In some embodiments of the present invention, network 106 is not provided. This scenario represents a non-network model of the present invention in which the user 102 interacts directly with ASP 108 through device 104 (e.g., a microphone).

Figure 2:
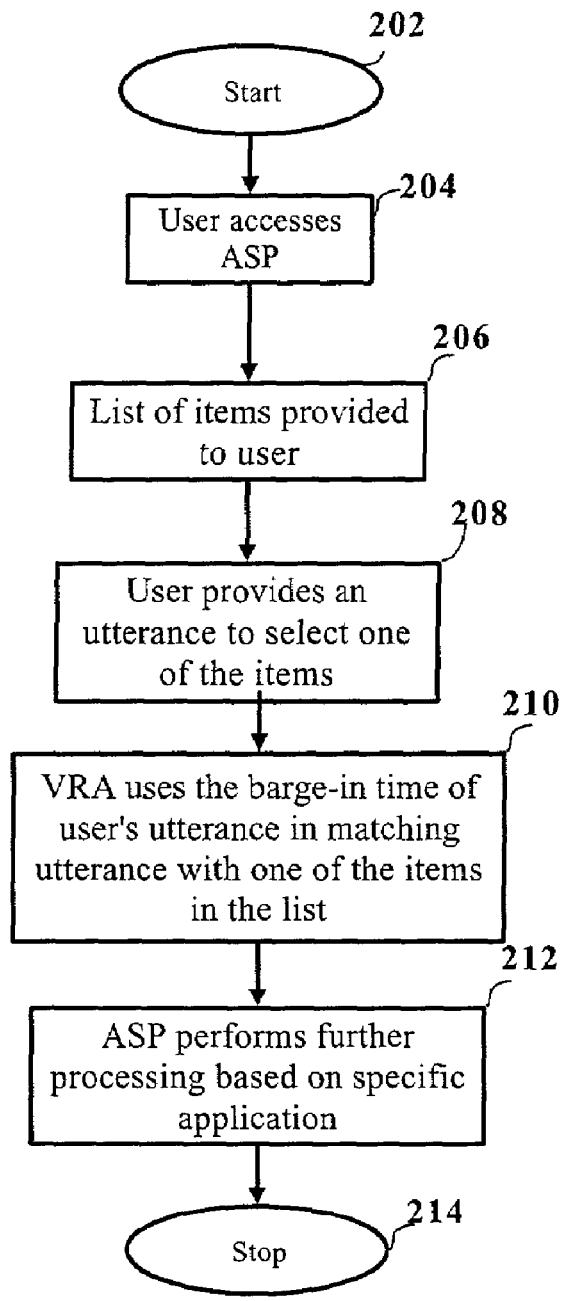
FIG. 2 is a flowchart depicting the general operation and control flow of the selection process of one embodiment of the present invention.

More detailed descriptions of the components of system 100, as well as their functionality and inter-functionality with other components, are provided below. The operation of the system of FIG. 1 according to one embodiment of the present invention is shown in the flowchart of FIG. 2.

2. General Operation

Generally, system 100 provides improved voice recognition when the user 102 selects an item from a list. FIG. 2 is a flowchart depicting the operation and control flow 200 of one embodiment of the present invention. In this flowchart, an exemplary product ordering system is described in which the user 102 can order a PC product from a merchant via a telephone. Control flow 200 begins with step 202 and flows directly to step 204.

In step 204, user 102 accesses ASP 108 (e.g., via user device 104). In this example, user 102 uses a telephone (device 104) and calls the PC merchant (ASP 108) over a POTS line (network 106). In step 206, ASP 108 audibly provides a list of items to user 102. In this example, the merchant connects with user 102 and an automated application proceeds to audibly provide a list of PC product manufacturers to user 102. User 102 hears, "Please choose from the following manufacturers: Dell, Gateway, HP, IBM and Compact."

In step 208, the user 102 provides an utterance to ASP 108 to select one of the items. In this example, user 102 then proceeds to say (or provide an utterance referring to) the desired manufacturer by speaking "Gateway" into the telephone. In step 210, the VRA uses the barge-in time of the user's utterance along with other factors based on voice recognition techniques to match the utterance of user 102 with one of the items in the list. The "barge-in time" is the time that the user provides an audible response relative to the items in the list provided by the ASP. In this example, the VRA receives the utterance of user 102 and, using the barge-in time and voice recognition techniques, matches this utterance with the "Gateway" item in the list. The matching operation is described in greater detail below. In step 212, ASP 108 performs further processing based on the matching item. In this example, ASP 108 completes the ordering process with user 102. This may include taking additional information such as the product model number and the billing or shipping address of user 102. In step 214, control flow 200 ceases. Step 210 of control flow 200 is described in greater detail below.

Figure 3:
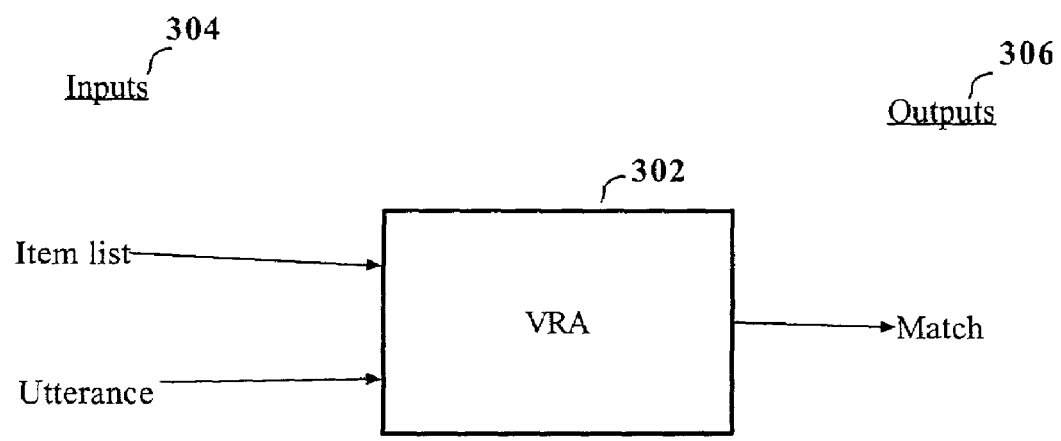
FIG. 3 is a block diagram illustrating the inputs and outputs of a conventional voice recognition application.

FIG. 3 is a block diagram 300 illustrating the inputs and outputs of a conventional voice recognition application. Diagram 300 shows a conventional VRA 302 for recognizing the selection of a user from an audible list provided to the user. Diagram 300 also shows the inputs 304 and the output 306 involved when VRA 302 performs the recognition function.

Conventional VRA 302 requires as inputs 304 an item list and an utterance from a user. The item list is a file or record or a group of files or records representing the items in the list. In an embodiment of the present invention, each file or record is a spoken representation of an item (i.e., it is an audio recording of a person speaking the name of the item). In another embodiment of the present invention, each file or record can be an audio signature data file representing an item. An audio signature data file is a file containing data which uniquely represents the audible representation of the item, such as a frequency chart. The utterance from the user can be stored similarly to the item list. In preferred embodiments of the present invention, the utterance is stored as a file or record containing an audio recording of the utterance or an audio signature data file.

The output 306 of conventional VRA 302 is a match. A match is simply a signal or other data representation that indicates the item which was matched with the utterance. In an embodiment of the present invention, a match is a number associated with the position of the matching item on the list. In another embodiment of the present invention, a match is a pointer to the file or record which represents the matching item on the list.

Figure 4:
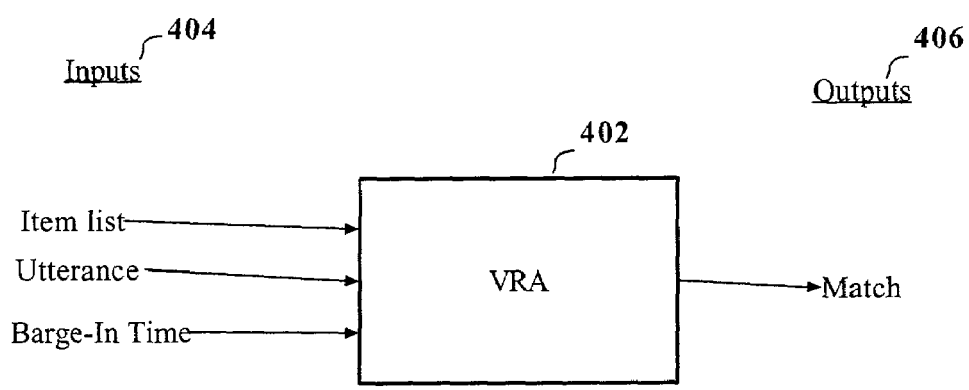
FIG. 4 is a block diagram illustrating the inputs and outputs of a voice recognition application according to one embodiment of the present invention.

FIG. 4 is a block diagram 400 illustrating the inputs and outputs of a voice recognition application according to one embodiment of the present invention. Diagram 400 shows a VRA 402 for recognizing the selection of a user from an audible list provided to the user. Diagram 400 also shows the inputs 404 and the output 406 involved when VRA 402 performs the recognition function. The recognition function is described in greater detail below. Diagram 400 roughly corresponds to the function performed in a preferred embodiment of the present invention in step 210 of FIG. 2.

VRA 404 requires as inputs 404 an item list, an utterance from a user and a barge-in time. As described above, the item list is a file or record or a group of files or records representing the items in the list. The utterance from the user can be stored similarly to the item list. The barge-in time represents the time at which the user 102 provided the utterance relative to the items in the list. The manner in which the barge-in time information is garnered in one embodiment is described in greater detail below. The barge-time is simply a signal or other data representation that indicates a time. In an embodiment of the present invention, the barge-in-time is provided as the amount of time that has passed, (e.g., measured in tenths of a second) since the ASP 108 begun to audibly provide the item list to user 102. In other words, the barge-in time counts the number of seconds into the audible item list at which the user 102 uttered a selection.

The output 406 of VRA 402 is a match. As described above, a match is simply a signal or other data representation that indicates the item from the list which was matched with the utterance by VRA 402.

3. Preferred Matching Operation

Figure 5:
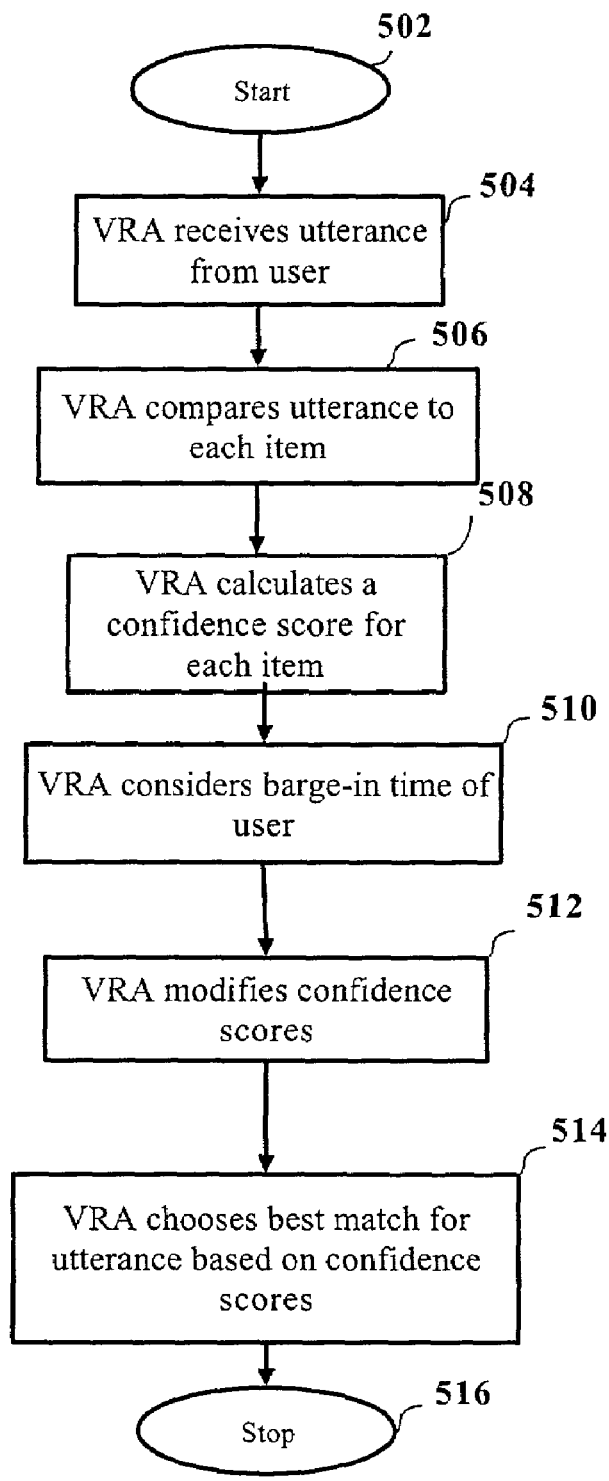
FIG. 5 is a flowchart depicting the operation and control flow of the matching process according to one embodiment of the present invention.

FIG. 5 is a flowchart depicting the operation and control flow 500 of the matching process according to one embodiment of the present invention. Generally, the operation of control flow 500 corresponds to the function performed in step 210 of FIG. 2 and, more specifically, the function performed by VRA 402 in FIG. 4. Control flow 500 begins with step 502 and flows directly to step 504.

In step 504, VRA 402 receives the utterance from a user. As described above, the utterance can be in the form of an audio file or an audio signature data file.

In step 506, VRA 402 compares the utterance of the user to each of the items on the list. This function can be performed using conventional voice recognition techniques, such as those implemented in commercially-available software products. Examples of such commercially available software products are the "SpeechWorks" and "OpenSpeech" software products available from Speech-Works, Inc. of Boston, Mass. These commercially-available software products have the capability to compare an utterance with a given item and provide the degree of similarity of the two.

In step 508, a confidence score is calculated for each item on the list. A confidence score is an indicator of the estimated accuracy of VRA 402. For example, a confidence score can be a percentage from 0% to 100% (with 100% representing almost perfect accuracy), or a number from 0 to 999 (with 999 representing almost perfect accuracy). A higher confidence score indicates that the VRA 402 is more certain that there is a match. A lower confidence score indicates that the VRA 402 is less certain that there is a match. The generation of a confidence score can be performed using conventional voice recognition techniques. The commercially available software products described above can be utilized to generate a confidence score.

In step 510, VRA 402 considers the barge-in time of the user 102. The barge-in time represents the time at which the user provided the utterance relative to the time ASP 108 began to provide the item list to the user. Thus, the barge-in time represents the amount of time that passed between the commencement of the audible list and the time of the user's utterance. One method for calculating this value is to use the echo cancellation time of the utterance of user 102. Echo cancellation is a common technique used by telecommunications carriers to regulate speech transmission between two speakers on one communications line. This technique does not allow a person on the line to speak into the line and listen to the line at the same time. Thus, when a person on the line speaks, he cannot hear the speech of the other person at the same time. Using this technique to its advantage, ASP 108 can calculate the time at which the user uttered his selection. In particular, ASP 108 can calculate the time of utterance by sensing the time at which echo cancellation begins. The time of utterance (i.e., the barge-in time) can be saved as a value in a file or in RAM.

In step 512, VRA 402 modifies the confidence scores generated in step 508 based on the calculated barge-in time. The barge-in time of the user is typically associated with the intended selection of the user. For example, it is common for a user to utter a selection immediately after the intended selection item is heard. In this case, it is likely that the intended selection of the user is the item most recently presented to the user. In another example, it is common for a user to utter a selection within a short time after the intended selection is presented. In this case, an item that was provided soon before the utterance time is the intended selection of the user. Using such principles of human response characteristics, the barge-in time is used to modify the confidence scores in preferred embodiments of the present invention.

In one embodiment of the present invention, the confidence score of the item that was provided immediately before the barge-in time is increased by a predetermined amount to reflect the barge-in time. This increases the accuracy of the VRA by taking into account the principle whereby a user typically barges-in immediately after the intended selection is heard. In another embodiment of the present invention, the confidence score of a first item that was provided immediately before the barge-in time is increased by a predetermined amount, the confidence score of the item that was provided immediately before the first item is increased by a smaller amount, and so on. This increases the accuracy of the VRA by taking into account the principle whereby a user typically barges-in soon after the intended selection is heard.

Additionally, in some embodiments, the confidence scores are not modified unless none of the confidence scores exceeds a predetermined threshold. In other words, the barge-in time is only taken into account when the VRA is not highly certain that any of the items in the list match the utterance. Similarly, in some embodiments, the confidence scores are only modified if the two highest scores are separated by less than a predetermined amount. Such controls prevent the barge-in time factor from changing the matching item when the VRA is already highly certain of a match based on other factors. Furthermore, in some embodiments, the confidence scores of all items provided after the barge-in time are reduced. Thus, in general, the barge-in time is used to influence the matching operation, with the exact affect of the barge-in time being dependent on the needs of the particular application.

In step 514, VRA 402 chooses the best match for the utterance of the user based on the confidence scores. In one embodiment of the present invention, VRA 402 chooses the item with the greatest confidence score. In step 526, control flow 500 ceases.

In some embodiments of the present invention, a minimum confidence threshold is used by VRA 402. A confidence threshold represents a threshold which the confidence score of an item must exceed in order to be considered for selection by VRA 402 in step 524. In the event that there are no items in the list that exceed the confidence threshold, a "no match" condition is indicated by VRA 402.

4. Barge-In Time

Figure 6:
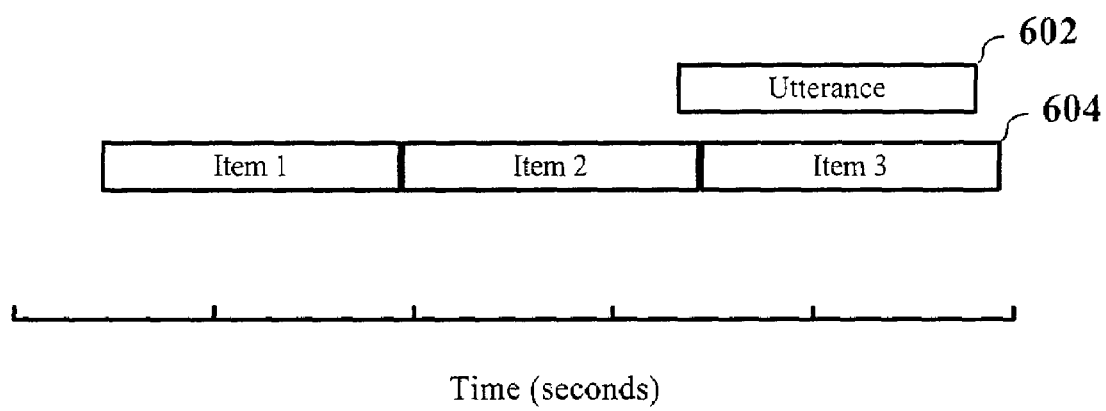
FIG. 6 is an illustration of a time line of events according to one embodiment of the present invention.

FIG. 6 is an illustration of a time line 600 of events according to one embodiment of the present invention. Time line 600 shows, on a scale of seconds, the audible provision of the items 604 of the list by ASP 108. Time line 600 also shows the provision of the utterance 602 by user 102. As shown in time line 600, the user barges-in with a selection approximately after the second item of the list was provided by ASP 108. As described above, the time at which the utterance 602 was provided strongly suggests the intended selection of the user. Processes of matching an utterance 602 with an item on the list are described in greater detail above.

5. Exemplary Implementations

Figure 7:
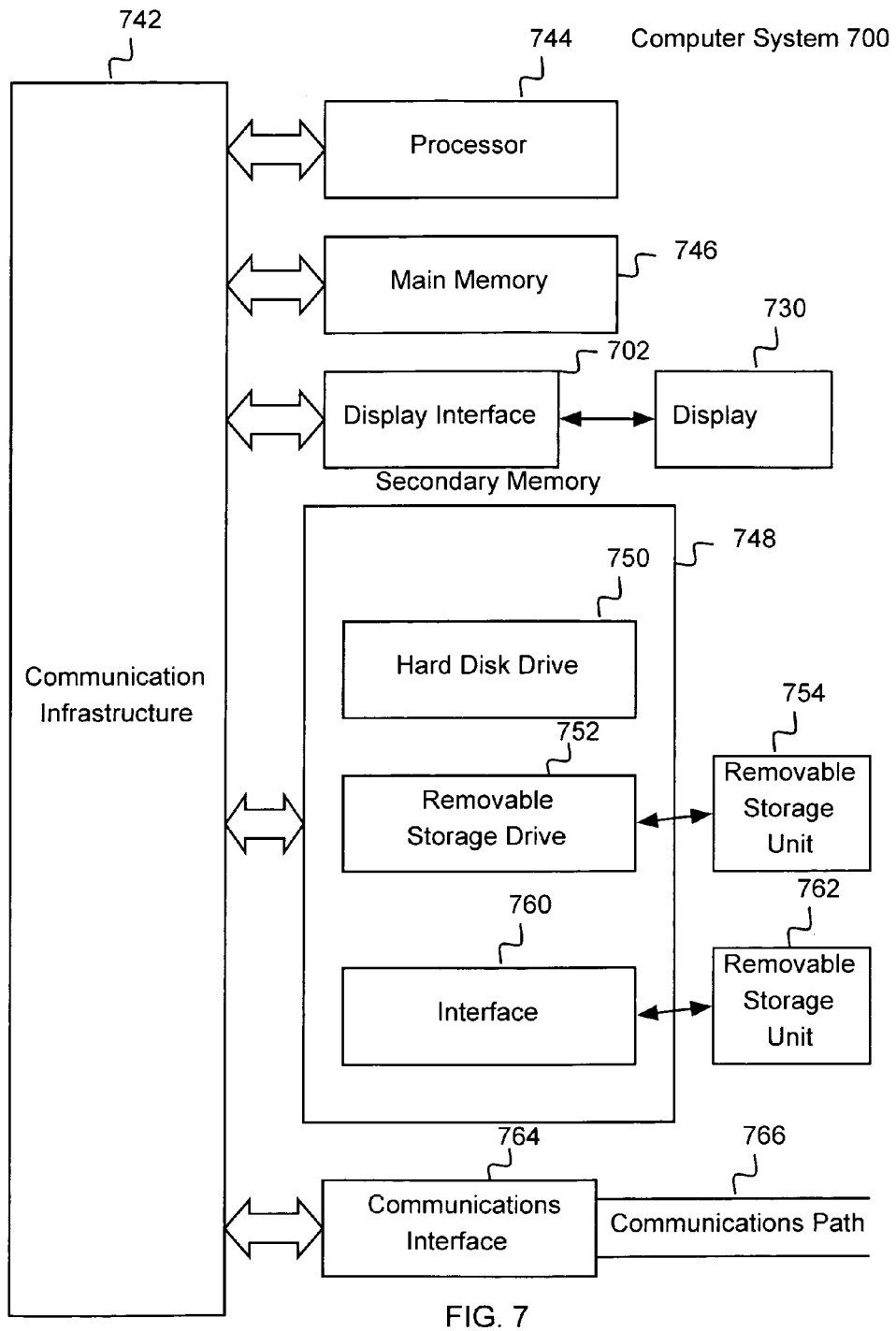
FIG. 7 is a block diagram of an exemplary computer system useful for implementing the present invention.

The present invention (e.g., system 100, flow 200, diagram 400 and flow 500 or any part thereof) may be implemented using hardware, software or a combination thereof, and may be implemented in one or more computer systems or other processing systems. An example of such a computer system is shown in FIG. 7. The computer system 700 represents any single or multi-processor computer. In conjunction, single-threaded and multi-threaded applications can be used. Unified or distributed memory systems can be used. Computer system 700, or portions thereof, may be used to implement the present invention. For example, the flow 200 of the present invention may comprise software running on a computer system such as computer system 700.

In one example, the flow 200 of the present invention is implemented in a multi-platform (platform independent) programming language such as JAVA, programming language/structured query language (PL/SQL), hyper-text mark-up language (HTML), practical extraction report language (PERL), Flash programming language, common gateway interface/structured query language (CGI/SQL) or the like. Java-enabled and JavaScript-enabled browsers are used, such as Netscape, HotJava, and Microsoft Internet Explorer browsers. Active content Web pages can be used. Such active content Web pages can include Java applets or ActiveX controls, or any other active content technology developed now or in the future. The present invention, however, is not intended to be limited to Java, JavaScript, or their enabled browsers, and can be implemented in any programming language and browser, developed now or in the future.

In another example, system 100 of the present invention, may be implemented using a high-level programming language (e.g., C++) and applications written for the Microsoft Windows or SUN OS environments. It will be apparent to a person of ordinary skill in the relevant art how to implement the present invention in alternative embodiments from the teachings herein.

Computer system 700 includes one or more processors, such as processor 744. One or more processors 744 can execute software implementing the routines described above, such as those shown in FIGS. 2–5. Each processor 744 is connected to a communication infrastructure 742 (e.g., a communications bus, cross-bar, or network). Various software embodiments are described in terms of this exemplary computer system. In further embodiments, the present invention is implemented using other computer systems and/or computer architectures.

Computer system 700 can include a display interface 702 that forwards graphics, text, and other data from the communication infrastructure 742 (or from a frame buffer) for display on the display unit 730.

Computer system 700 also includes a main memory 746, preferably random access memory (RAM), and can also include a secondary memory 748. The secondary memory 748 can include, for example, a hard disk drive 750 and/or a removable storage drive 752 (such as a floppy disk drive, a magnetic tape drive, an optical disk drive, or the like). The removable storage drive 752 reads from and/or writes to a removable storage unit 754 in a conventional manner. Removable storage unit 754 represents a floppy disk, magnetic tape, optical disk, or the like., which is read by and written to by removable storage drive 752. The removable storage unit 754 includes a computer usable storage medium having stored therein computer software and/or data.

In alternative embodiments, secondary memory 748 may include other similar means for allowing computer programs or other instructions to be loaded into computer system 700. Such means can include, for example, a removable storage unit 762 and an interface 760. Examples can include a program cartridge and cartridge interface (such as that found in video game console devices), a removable memory chip (such as an EPROM or PROM) and associated socket, and other removable storage units 762 and interfaces 760 which allow software and data to be transferred from the removable storage unit 762 to computer system 700.

Computer system 700 can also include a communications interface 764. Communications interface 764 allows software and data to be transferred between computer system 700 and external devices via communications path 766. Examples of communications interface 764 can include a modem, a network interface (such as an Ethernet card), a communications port, other interfaces described above, and the like. Software and data transferred via communications interface 764 are in the form of signals which can be electronic, electromagnetic, optical or other signals capable of being received by communications interface 764, via communications path 766. Note that communications interface 764 provides a means by which computer system 700 can interface to a network such as the Internet.

The present invention can be implemented using software executing in an environment similar to that described above with respect to FIGS. 2–5. The term "computer program product" includes a removable storage unit 754, a hard disk installed in hard disk drive 750, or a carrier wave carrying software over a communication path 766 (wireless link or cable) to communication interface 764. A "machine-readable medium" can include magnetic media, optical media, semiconductor memory or other recordable media, or media that transmits a carrier wave or other signal. These computer program products are means for providing software to computer system 700.

Computer programs (also called computer control logic) are preferably stored in main memory 746 and/or secondary memory 748. Computer programs can also be received via communications interface 764. Such computer programs, when executed, enable the computer system 700 to perform the features of the present invention as discussed herein. In particular, the computer programs, when executed, enable the processor 744 to perform features of the present invention. Accordingly, such computer programs represent controllers of the computer system 700.

The present invention can be implemented as control logic in software, firmware, hardware or any combination thereof. In an embodiment in which the present invention is implemented using software, the software may be stored on a computer program product and loaded into computer system 700 using removable storage drive 752, hard disk drive 750, or interface 760. Alternatively, the computer program product may be downloaded to computer system 700 over communications path 766. The control logic (e.g., software), when executed by one or more processors 744, causes the processor(s) 744 to perform functions of the present invention as described herein.

In another embodiment, the present invention is implemented primarily in firmware and/or hardware using, for example, hardware components such as application specific integrated circuits (ASICs). A hardware state machine is implemented so as to perform the functions described herein.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims,

What is claimed is:

1. A method for automated voice recognition, said method comprising the steps of:
    providing an audible list containing a plurality of items;
    receiving an utterance indicating a selected one of the items from the list; and
    performing a matching operation that uses a time that the utterance was received in making a determination that matches the utterance with one of the items from the list, the time that the utterance was received influencing the determination of which one of the items from the list matches the utterance.

2. The method of claim 1, wherein the performing step includes sub-steps of:
    comparing the utterance to each of the items in the list so as to generate a confidence score for each of the items in the list, the confidence score for at least one of the items being influenced by the time that the utterance was received relative to the items in the list; and
    selecting the matched one of the items based on the confidence scores of the items in the list.

3. The method of claim 1, wherein the performing step includes the sub-step of determining the time that the utterance was received based on an echo cancellation time for the utterance.

4. The method of claim 1, wherein in the matching operation, the degree of proximity between the time of the utterance and a time when each of the items was provided is used in matching the utterance with one of the items from the list.

5. The method of claim 1, wherein the performing step includes sub-steps of:
    determining when the utterance was received relative to the items in the list; and
    using when the utterance was received relative to the items in the list to influence the determination of which one of the items from the list matches the utterance.

6. The method of claim 5, wherein in the using sub-step, when the utterance was received relative to the items in the list influences a confidence score of at least one of the items from the list.

7. The method of claim 1, wherein the performing step includes sub-steps of:
    calculating an initial confidence score for each of the items in the list based on a comparison of the utterance to the item; and
    selectively modifying the initial confidence scores based on the time that the utterance was received relative to the items in the list.

8. The method of claim 7, wherein the comparison of the utterance to the item is performed using natural language processing.

9. The method of claim 7, wherein in the sub-step of selectively modifying the initial confidence scores, the initial confidence scores of the items that were provided after the time that the utterance was received are decreased.

10. The method of claim 7, wherein in the sub-step of selectively modifying the initial confidence scores, the initial confidence score of the item that was provided immediately before the time that the utterance was received is increased by a first amount.

11. The method of claim 10, wherein in the sub-step of selectively modifying the initial confidence scores, the initial confidence score of the item that precedes the item that was provided immediately before the time that the utterance was received is increased by a second amount, which is less than the first amount.

12. A method for automated voice recognition, said method comprising the steps of:
    providing an audible list containing a plurality of items;
    receiving an utterance indicating a selected one of the items from the list; and
    matching the utterance with a matched one of the items from the list based on a time that the utterance was received,
    wherein in the matching step, the utterance is matched with the matched one of the items based on the degree of proximity between the time of the utterance and a time when each of the items was provided.

13. A machine-readable medium encoded with a program for automated voice recognition, said program containing instructions for performing the steps of:
    providing an audible list containing a plurality of items;

receiving an utterance indicating a selected one of the items from the list; and performing a matching operation that uses a time that the utterance was received in making a determination that matches the utterance with one of the items from the list, the time that the utterance was received influencing the determination of which one of the items from the list matches the utterance.

14. The machine-readable medium of claim 13, wherein the performing step includes the sub-steps of:

comparing the utterance to each of the items in the list so as to generate a confidence score for each of the items in the list, the confidence score for at least one of the items being influenced by the time that the utterance was received relative to the items in the list; and selecting the matched one of the items based on the confidence scores of the items in the list.

15. The machine-readable medium of claim 13, wherein in the performing step, the utterance is matched with one of the items based on the degree of proximity between the time of the utterance and a time when each of the items was provided.

16. The machine-readable medium of claim 13, wherein the performing step includes the sub-step of determining the time that the utterance was received based on an echo cancellation time for the utterance.

17. The machine-readable medium of claim 13, wherein the performing step includes sub-steps of:

calculating an initial confidence score for each of the items in the list based on a comparison of the utterance to the item; and selectively modifying the initial confidence scores based on the time that the utterance was received relative to the items in the list.

18. The machine-readable medium of claim 17, wherein in the sub-step of selectively modifying the initial confidence scores, the initial confidence score of the item that was provided immediately before the time that the utterance was received is increased by a first amount.

19. The machine-readable medium of claim 17, wherein in the sub-step of selectively modifying the initial confidence scores, the initial confidence scores of the items that were provided after the time that the utterance was received are decreased.

20. An automated voice recognition system comprising:

a first input for receiving a list containing a plurality of items;

a second input for receiving an utterance indicating a selected one of the items from the list;

a third input for receiving a time that the utterance was received; and a comparator for performing a matching operation that uses the time that the utterance was received in making a determination that matches the utterance with one of the items from the list, the time that the utterance was received influencing the determination of which one of the items from the list matches the utterance.

21. The automated voice recognition system of claim 20, wherein the comparator compares the utterance to each of the items in the list so as to generate a confidence score for each of the items in the list, and selects the matched one of the items based on the confidence scores of the items in the list, and the confidence score for at least one of the items is influenced by the time that the utterance was received relative to the items in the list.

22. The automated voice recognition system of claim 20, wherein the comparator matches the utterance with one of the items based on the degree of proximity between the time of the utterance and a time when each of the items was provided.

23. The automated voice recognition system of claim 20, wherein the comparator generates confidence scores for each of the items in the list by:

calculating an initial confidence score for each of the items in the list based on a comparison of the utterance to the item; and selectively modifying the initial confidence scores based on the time that the utterance was received relative to the items in the list.

24. The automated voice recognition system of claim 23, wherein the initial confidence score of the item that was provided immediately before the time that the utterance was received is increased by a first amount.

* * * * *